United States Patent
Beiler et al.

(10) Patent No.: US 9,929,477 B2
(45) Date of Patent: Mar. 27, 2018

(54) TORQUE LIMITED SCREW FOR ELECTRICAL CONNECTOR

(71) Applicant: Ilsco Corporation, Cincinnati, OH (US)

(72) Inventors: Michael W. Beiler, Cincinnati, OH (US); Eric D. Besterman, Cincinnati, OH (US); Stephen M. Jackson, Batavia, OH (US); Alan Merritt, Harrison, OH (US); Philip G. Reed, Cincinnati, OH (US); Richard L. Shank, Harrisonburg, VA (US); Thomas M. Sweeney, Cincinnati, OH (US); Carl J. Taylor, Cincinnati, OH (US)

(73) Assignee: Ilsco Corporation, Cincinnati, OH (US)

( * ) Notice: Subject to any disclaimer, the term of this patent is extended or adjusted under 35 U.S.C. 154(b) by 0 days.

(21) Appl. No.: 15/139,416

(22) Filed: Apr. 27, 2016

(65) Prior Publication Data
US 2016/0322715 A1    Nov. 3, 2016

Related U.S. Application Data

(60) Provisional application No. 62/155,024, filed on Apr. 30, 2015.

(51) Int. Cl.
| H01R 4/36 | (2006.01) |
| F16B 35/04 | (2006.01) |
| F16B 31/02 | (2006.01) |

(52) U.S. Cl.
CPC ........... *H01R 4/366* (2013.01); *F16B 31/021* (2013.01); *F16B 35/042* (2013.01)

(58) Field of Classification Search
CPC .......... H01R 4/36; H01R 4/363; H01R 4/366; F16B 31/021
See application file for complete search history.

(56) References Cited

U.S. PATENT DOCUMENTS

| 1,266,441 A | 5/1918 | Finkelstein |
| 1,336,290 A | 4/1920 | Finkelstein |
| 2,068,152 A | 1/1937 | Rowe |
| 2,193,202 A | 3/1940 | Millermaster |
| 2,201,674 A | 5/1940 | Rowe et al. |
| 3,015,084 A | 12/1961 | Gribble |

(Continued)

*Primary Examiner* — Edwin A. Leon
*Assistant Examiner* — Oscar Jimenez
(74) *Attorney, Agent, or Firm* — Wood Herron & Evans LLP

(57) ABSTRACT

A torque limited screw is used to secure a conductor to an electrical connector. The screw has a torque limiting feature between a head and a body of the screw which must be overcome by force to break the head free from the screw body. The screw assembly includes a threaded body configured to be releasably coupled to a coupling portion of the connector. A head of the screw assembly is joined to the body via a neck portion which under a specified torque applied to the head fractures to break the head away from the body seated in the connector and securing the conductor. In one embodiment, the screw includes a plate spaced from and coupled to the threaded body for contacting the conductor. The plate is rotatable relative to the threaded body when the threaded body is coupled to the coupling portion of the connector.

20 Claims, 3 Drawing Sheets

(56) References Cited

U.S. PATENT DOCUMENTS

| | | | | |
|---|---|---|---|---|
| 3,125,397 | A | 3/1964 | McGrath | |
| 3,339,174 | A | 8/1967 | Walter et al. | |
| 3,350,677 | A | 10/1967 | Daum | |
| 3,426,319 | A | 2/1969 | Downs et al. | |
| 3,650,025 | A | 3/1972 | McLaughlin et al. | |
| 3,737,839 | A | 6/1973 | Marechal | |
| 3,836,941 | A | 9/1974 | Izraeli | |
| 3,864,005 | A | 2/1975 | Klein | |
| 3,963,322 | A * | 6/1976 | Gryctko | H01R 4/36 411/2 |
| 4,037,515 | A * | 7/1977 | Kesselman | F16B 41/005 411/3 |
| 4,059,335 | A | 11/1977 | Simon et al. | |
| 4,072,393 | A | 2/1978 | McDermott et al. | |
| 5,690,515 | A | 11/1997 | Cipolla | |
| 5,697,929 | A * | 12/1997 | Mellinger | A61B 17/7001 411/5 |
| 5,713,705 | A * | 2/1998 | Grunbichler | F16B 31/021 411/410 |
| 6,080,024 | A * | 6/2000 | Miller | H01R 4/38 439/812 |
| 6,176,659 | B1 * | 1/2001 | Hardt | F16B 31/021 411/393 |
| 6,186,839 | B1 | 2/2001 | Storey et al. | |
| 6,209,424 | B1 * | 4/2001 | Croton | F16B 31/021 81/119 |
| 6,210,239 | B1 | 4/2001 | Harting et al. | |
| 6,321,624 | B1 * | 11/2001 | Croton | F16B 31/021 81/119 |
| 6,338,658 | B1 | 1/2002 | Sweeney | |
| 6,478,795 | B1 * | 11/2002 | Gournay | A61B 17/7049 411/5 |
| 6,764,354 | B2 | 7/2004 | Kaine et al. | |
| 7,090,532 | B1 | 8/2006 | Kaine | |
| 7,699,669 | B2 | 4/2010 | Sweeney et al. | |
| 8,079,884 | B2 * | 12/2011 | Stauch | H01R 4/366 439/810 |
| 8,317,443 | B2 | 11/2012 | Stauch et al. | |
| 8,911,189 | B2 * | 12/2014 | Caponera | F16B 31/021 411/1 |
| 9,366,282 | B2 | 6/2016 | Vallette et al. | |
| 2007/0253792 | A1 * | 11/2007 | Zahnen | F16B 23/0038 411/5 |
| 2009/0053940 | A1 * | 2/2009 | Sweeney | H01R 4/366 439/791 |
| 2011/0318953 | A1 | 12/2011 | Battle | |
| 2015/0071728 | A1 | 3/2015 | Vallette et al. | |
| 2016/0097417 | A1 * | 4/2016 | Castonguay | H01R 4/36 29/857 |
| 2016/0104953 | A1 * | 4/2016 | Blake | H01R 4/36 439/791 |

* cited by examiner

TORQUE LIMITED SCREW FOR ELECTRICAL CONNECTOR

This claims the benefit of U.S. Provisional Patent Application Ser. No. 62/155,024, filed Apr. 30, 2015 and hereby incorporated by reference in its entirety.

BACKGROUND OF THE INVENTION

This invention relates generally to a torque limited or shear screw for use with an electrical connector, and more particularly, to such a screw which has a torque limiting feature between a head and a body of the screw which must be overcome by force to break the head free from the screw body.

Various types of electrical connectors are used for connecting electrical conductors to one another or to the terminals of electrical devices. Conventional connectors receive a conductor within a channel or the like and then receive a screw. The screw is then tightened against the conductor so that it is held in physical contact with the connector.

In the connector industry, often times shear bolts and screws are used to serve the dual function of securing a wire or conductor in a connector and providing a screw that will break off at some position above the connector housing. There are various disadvantages to current designs of these shear bolts and screws. One disadvantage is that they are expensive to manufacture. Another disadvantage is that such known shear bolts or screws are complex, intricate devices, often being constructed of multiple distinct components. Such construction techniques lead to the higher expense and often unreliable and/or complicated implementation.

Another aspect of known connector assemblies is that the conductors are made of a soft material such as copper or aluminum and may further be defined by a series of individual bare strands. Conventional connectors and, more particularly, screws used with such connectors, may have a tendency to damage the conductors. Pointed, angled or tapered screw configurations often dent or damage the strands.

Connections between connectors and conductors may also involve different materials. For example, the screw of a connector may be made of one material while a conductor may be made of another. Different materials may have different rates of expansion and contraction. Accordingly, the life span of the connection and/or the temperatures to which the connector and conductor may be subject to lead to relative movement between the connector and the conductor. This movement causes loosening of the connection, which leads to an inadequate electrical connection between the parts involved.

Loose connections may also arise from different degrees of elasticity of the parts involved. More particularly, one element may exhibit one degree of elastic deformation during engagement of the screw with the conductor, while another material will exhibit a different degree of elastic deformation. These different degrees of elastic deformation lead to different degrees of material recovery, which may result in loose connections.

Known connectors may be used in areas subject to relatively high degrees of vibration. In such types of environment, vibration may similarly lead to lose connections between the conductor and the connector. More particularly, vibration may lead to movement of the screw relative to the connector. This relative movement, in turn, loosens the physical contact between them. As a way to compensate for this observed loosened connection, a user often performs periodic maintenance to retorque the connection. Without such maintenance, the loose connection may eventually result, for example, in elevated operating temperatures in the connection, which in turn may result in a failed connection. However, such maintenance is either not performed in many situations or, in the case of shear bolts and screws of known designs, cannot be performed because the drive portion of the bolt or screw has been removed.

Therefore, it is desirable to have a connector and a corresponding shear bolt or screw that address the drawbacks of conventional connectors and shear bolts or screws.

SUMMARY OF THE INVENTION

These and other problems in the prior art have been addressed with this invention. In one embodiment according to this invention, a screw assembly for use with an electrical connector secures a conductor and includes a threaded body configured to be coupled to a threaded coupling portion of the connector and a head extending from the threaded screw body.

This invention provides a torque controlling break or shear screw for securing a wire or cable conductor within the connector. There is a torque limiting feature between a screw body and a head of the screw. The head is secured at a distal end of the screw body and is used to tighten the screw into the connector. Once the strength of the torque limiting feature that secures the head onto the distal end of the screw body is exceeded, the head breaks loose from the distal end of the screw body. A removal and/or a retightening feature is also provided so that the screw can be backed out of the connector or retightened in the connector, if necessary, to allow removal or re-establish a secure connection on the wire, conductor or cable from the connector.

In another embodiment, a plate is spaced from and coupled to the threaded screw body and has a flat contacting surface configured for contacting the conductor. The plate is coupled to the threaded screw body to enable rotation of the plate relative to the screw body. The plate is restricted from movement away from the screw body when the screw body is not coupled to the coupling portion of the connector. A spacer is positioned between the plate and the screw body and configured to urge the plate away from the screw body. The spacer may alternatively or additionally be configured to deflect toward the screw body when the plate contacts the conductor. The plate may be rotatable relative to the spacer. In specific embodiments, the plate is configured for movement toward the threaded body.

In another embodiment according to this invention, a method of securing a conductor to a connector includes positioning the conductor within the connector. A first portion of a unitary structure is releasably coupled with a coupling portion of the connector. A second portion of the unitary structure engages the conductor. The first and second portions are spaced from one another. The method includes rotating the unitary structure relative to the connector until the rotational torque on the unitary structure exceeds a limit at which a third portion of the unitary structure fractures from the unitary structure with the remaining portions of the unitary structure securing the conductor to the connector.

In various embodiments of this invention, the screw assembly offers both an internal and external drive mechanism. In various embodiments, the drive mechanisms are selected based on the tools most commonly carried by an installer; namely a 5/16 Allen wrench and a 9/16 hex socket wrench. Undercut between the head and external drive and the screw body of the screw assembly is a neck designed to shear at a specified and appropriate torque value for the application. The sheared off head portion of the screw can be retained and used as proof that the screw has been properly torqued. The external drive mechanism can be any shape, hexagonal, pentagonal, square etc. The internal drive mechanism can be any shape, hexagonal, pentagonal, square, etc. The screw assembly was designed for single pass machinability and, therefore, low cost production. Single piece construction of the screw assembly and external drive mechanism are provided. No secondary manufacturing operations are required. Known shear screws require a separate nut to be threaded onto and pinned to the body of the screw to provide the external drive and specified twist off torque. Any pitch and thread type can be used with the present invention. Any material can be used.

The various embodiments of this invention solve the above-described problems with prior shear screw assemblies.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein.

DETAILED DESCRIPTION OF THE INVENTION

Figure 1:
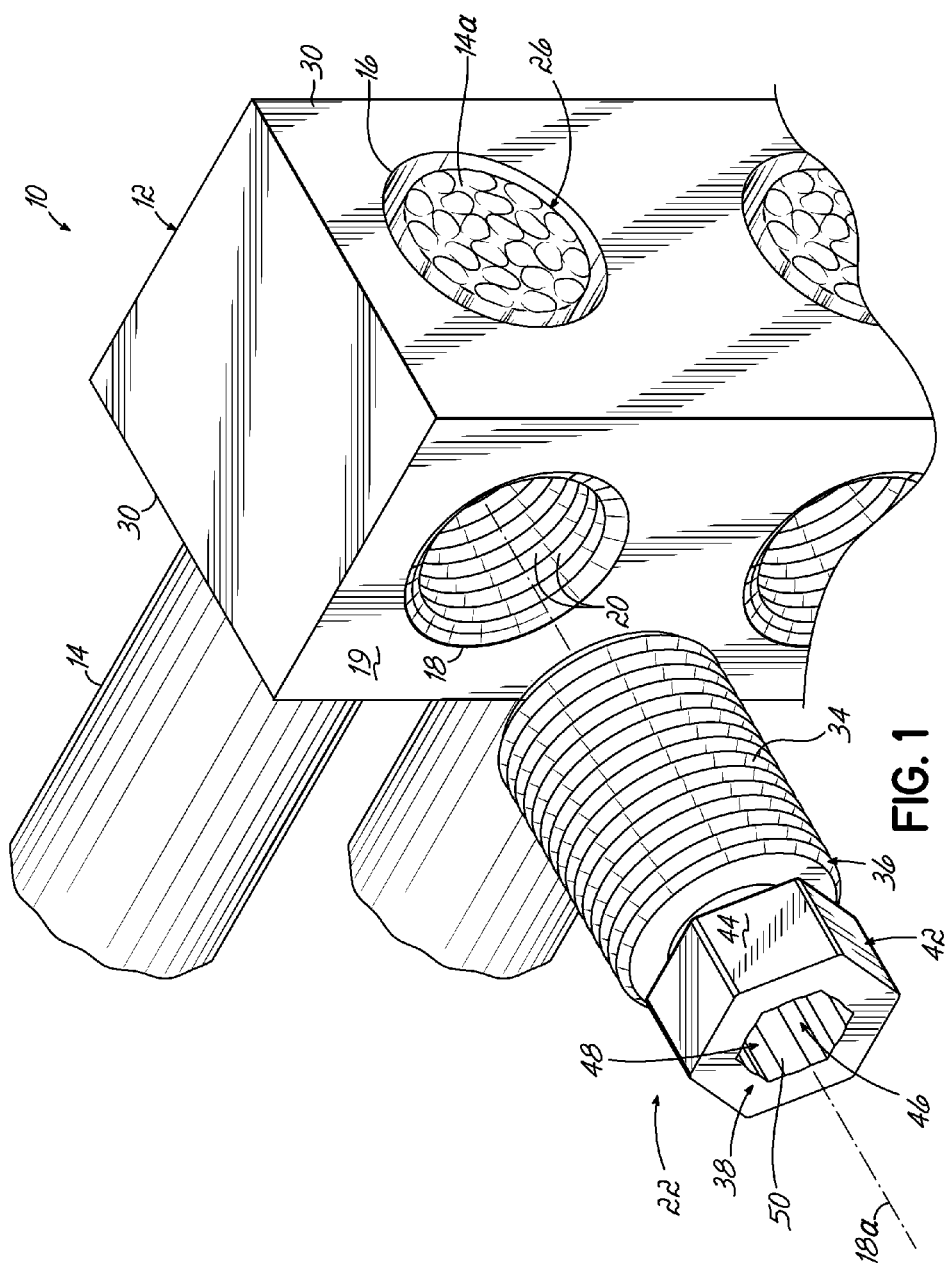
FIG. 1 is a perspective view of a connector and screw assembly in accordance with an embodiment of this invention.

With reference to the drawings and, more particularly to FIG. 1, a connector 10 according to one embodiment of this invention includes a connector body 12 that is adapted to receive one or more conductors 14. To that end, the connector body 12 includes one or more apertures 16 that each permit introduction of a conductor 14 into and/or through the body 12. The body 12 includes one or more bores 18 each having an axis 18a, extending from a surface 19 of the body 12, and which is defined by a threaded wall 20 for receiving a screw assembly 22 in communication with one of the apertures 16. In this exemplary embodiment, the body 12 has a generally square cross section, although persons of ordinary skill in the art will readily appreciate that other shapes are similarly contemplated. The body 12 may include multiple apertures to facilitate coupling additional conductors 14 or other components to the connector 10. Moreover, while only two bores 18 and two apertures 16 are shown, any number, configuration and arrangement of bores and apertures are within the scope of this invention.

As noted above, the body 12 is adapted to receive one or more conductors 14. More particularly, the body 12 of this exemplary embodiment includes the aperture 16 that defines a conductor bore 26 extending at least partially through the body 12 in a direction generally transverse to the axis 18a of the bore 18. This transverse orientation of the conductor bore 26 permits, as explained below, securement of the conductor 14 within the body 12 via engagement of the screw assembly 22. The conductor bore 26 is suitably sized to receive a range of sizes of conductors 14. The conductor may be defined by multiple strands 14a. The conductor bore 26 therefore, is suitably sized to receive the strands 14a which may in some cases diverge in different directions. The conductor bore 26 moreover may extend between opposed walls 30 of the body 12.

Figure 2:
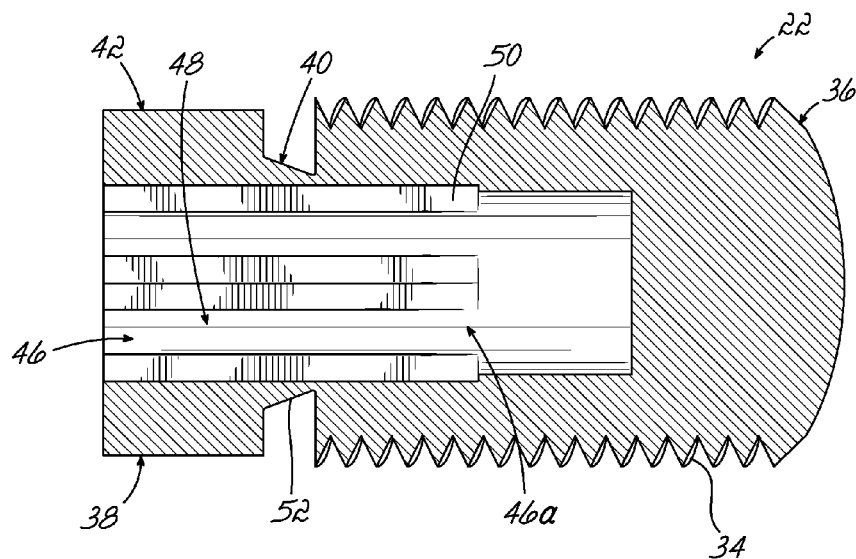
FIG. 2 is a cross-sectional view of the screw assembly of FIG. 1.
Figure 3:
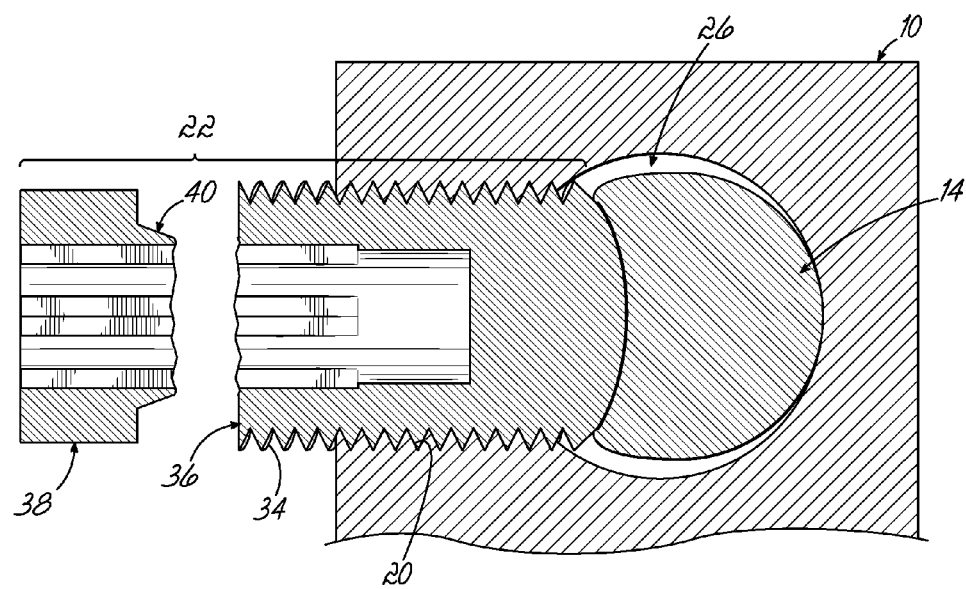
FIG. 3 is a cross-sectional view of the screw assembly of FIGS. 1 and 2 seated within the connector of FIG. 1 with a head of the screw assembly broken off from a body of the screw assembly.

With reference to FIGS. 1-3, the screw assembly 22 of various embodiments according to this invention is a unitary structure and engages the body 12 of the connector 10 through engagement of the threaded wall 20 of the bore 18 with exterior threads 34 on a body portion 36 of the screw assembly 22. More particularly, the screw assembly 22 engages the body 12 of the connector 10 in such a way that the screw assembly 22 is releasably coupled to the body 12. The screw assembly 22 includes a threaded screw body 36 and a head 38 extending axially from the threaded screw body 36. The head 38 is joined to the threaded screw body 36 by a neck portion 40 of the screw assembly 22 as shown most clearly in FIG. 2. The outer periphery of the head 38 includes an external drive mechanism 42 which in one embodiment is shaped with a number of facets 44, six of which are shown in the embodiments in FIGS. 1-3. Each facet 44 is generally flat or planar and the overall configuration of the head 38 including its outer periphery is designed for engagement with a tool (not shown) such as a hex socket, wrench, pliers or other implement for rotating the screw assembly 22.

In addition, a bore 46 is provided axially in the head 38 and extending through the neck 40 and into the body portion 36 of the screw assembly 22 in various embodiments as shown in FIGS. 2 and 3. The surface wall defining the bore 46 includes an internal drive mechanism 48 which in one embodiment has a number of facets 50 as shown particularly in FIGS. 2 and 3 which are sized and configured for engagement with a tool (not shown) such as an Allen wrench. The bore or socket 46 formed by the facets allows for engagement with a tool such as the Allen wrench for rotating the screw assembly 22 and insertion or removal depending on the direction of rotation relative to the connector body 12.

The neck portion 40 joins the head 38 to the screw body 36 of the screw assembly 22 according to various embodiments of this invention. As readily seen in FIGS. 1-3, the neck 40 may be a narrowed region formed at least in part by a tapered annular wall 52 between the head 38 and body portion 36 of the screw assembly 22. Rotation of the screw assembly 22 via either the external drive 42 or internal drive 48 advances the screw 22 into the bore 18 and ultimately into contact with the conductor 14 seated within the conductor bore 26 as shown in FIG. 3. Continued rotation in the direction to advance the screw 22 towards the conductor 14 may result in compression of the conductor 14 and ultimately, when the torque applied to the head 38 of the screw assembly 22 reaches a specified limit, continued rotation of the head 38 results in fracture of the screw assembly 22 at the neck 40 as shown in FIG. 3. Upon fracture of the neck 40, the head 38 is separated from the threaded screw body 36 of the screw assembly 22 as shown in FIG. 3 and the screw body 36 is securely seated in the connector 10 in engagement with the conductor 14 as shown in FIG. 3.

Advantageously, according to various embodiments of this invention, even after the head 38 is fractured at the neck 40 of the screw assembly 22, the internal drive 48, or at least a portion thereof as shown by the facets 50 in the bore 46 of the screw assembly 22, are accessible to a user for insertion of a tool such as an Allen wrench or the like by which the screw body 36 may be rotated relative to the connector 10 to retract and/or advance the screw body 36 within the bore 18 and release or re-secure the conductor 14 relative to the conductor bore 26. Continued rotation of the screw assembly 22 in one direction results in retrograde movement of the screw body 36 within the bore 18 and ultimately removal of the screw body 36 from the connector 10 as may be desired in certain situations. Continued rotation of the screw assembly 22 in an opposite direction results in advancement of the screw body 36 within the bore 18 and ultimately re-securing of the screw body 36 with the connector 10 as may be desired in certain situations.

Figure 4:
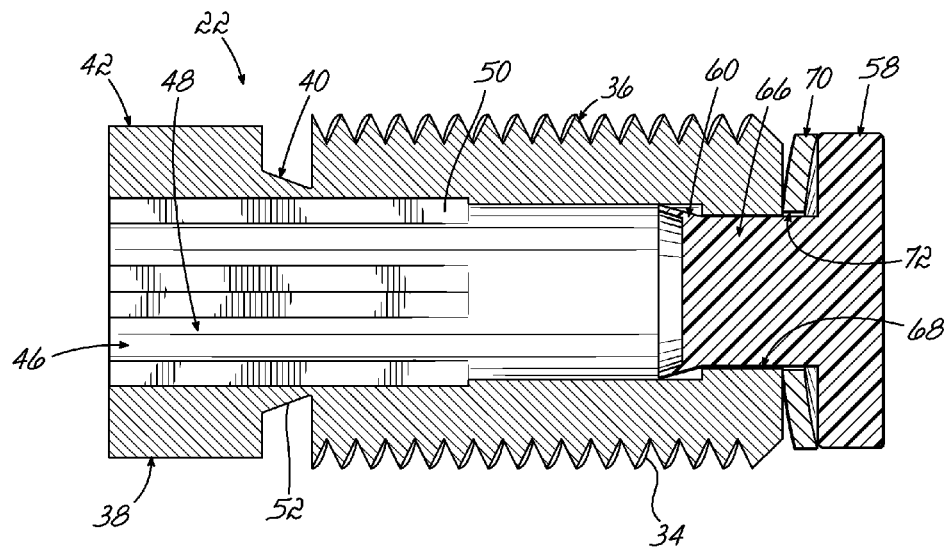
FIG. 4 is a cross-sectional view of an alternative embodiment of the screw assembly of this invention.
Figure 5:
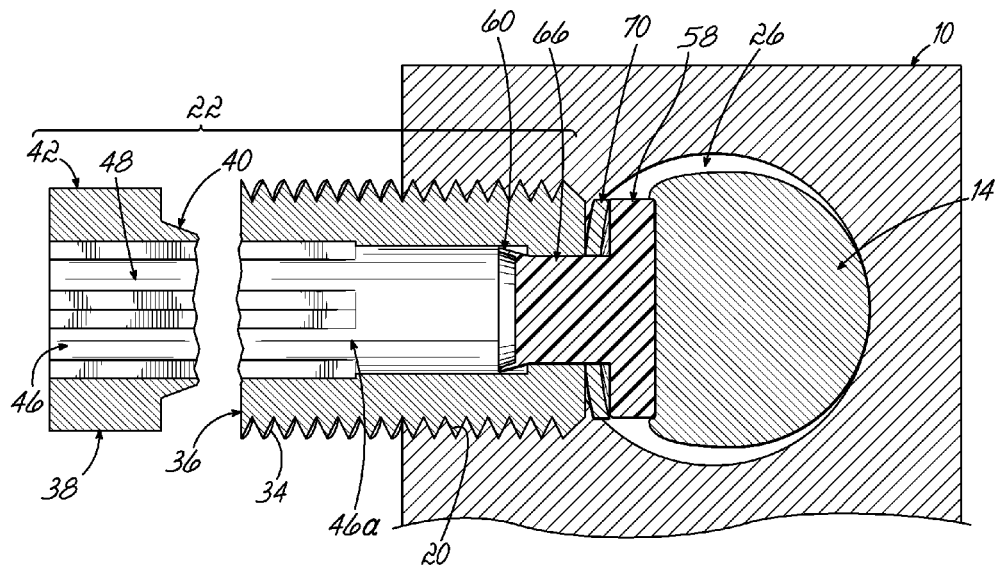
FIG. 5 is a cross-sectional view of the screw assembly of FIG. 4 seated within the connector of FIG. 1 with a head of the screw assembly broken off from a body of the screw assembly.

Another embodiment of the screw assembly 22 according to this invention is shown in FIGS. 4 and 5. This embodiment includes a contact plate 58 located at a distal end of the threaded screw body.

A T-shaped contact plate 58 is rotationally coupled to the threaded screw body 36 and free to rotate relative to the body 36 in some embodiment. Rotational coupling of the contact plate 58 is facilitated by press fitting or the like of an end portion 60 of a shank 66 coupled to the contact plate 58 within a bore 68 of the threaded screw body 36.

The contact plate 58 is spaced from the threaded screw body 36 in the assembled, unitary configuration of the screw assembly 22. In particular, the space between the contact plate 58 and the screw body 36 is defined by a distance between the contact plate 58 and a point of coupling between the end portion 60 of the shank 66 within the bore 68 of the screw body 36. This space, along with the coupling of the shank 66 within the bore 68 enable rotational movement of the contact plate 58 relative to the threaded screw body 36, even when the screw assembly 22 is coupled to the body 12 of the connector 10. A spacer 70, which in this exemplary embodiment takes the form of a cup spring washer (i.e., a Belleville washer), is positioned between the threaded screw body 36 and the contact plate 58. In this regard, the cup spring washer 70 includes an aperture 72 that is configured to receive the shank 66. When the threaded screw body 36, the contact plate 58 and the cup spring washer 70 are coupled to one another, the screw assembly 22 defines a unitary structure that is engageable with the body 12 of the connector 10. As such, even though the screw assembly 22 includes a number of discrete components, those components, when assembled, are not intended to be disassembled. Therefore, the screw assembly 22 is usable in the field without the need for any disassembly or assembly.

Coupling of the shank 66 within the bore 68 of the threaded body 36 also restricts movement of the contact plate 58 relative to the screw body 36, such that the contact plate 58 cannot be separated from the screw body 36. Moreover, this coupling permits movement of the contact plate 58 toward the screw body 36. The amount of movement permitted by this coupling is defined by a spacing between the cup spring washer 70 and a top surface of contact plate 58. The amount of movement is further defined by the particular type of coupling between the end portion 60 of shank 66 and a lip 74 bordering the bore 68 of the threaded screw body 36.

Axial movement of the contact plate 58 relative to the screw body 36 is limited by the cup spring washer 70. More particularly, the cup spring washer 70 has a projecting surface that faces the contact plate 58 and which is deflectable in a direction along a longitudinal axis of the bore 68 of the screw body 36. In this regard, a force exerted between the conductor 14 and a contact surface of the contact plate 58 in a direction along the axis deflects the cup spring washer 70 such that the projecting surface is pushed toward the screw body 36. This deflection, in turn, permits movement of the contact plate 58 toward the threaded body 36. Resiliency of the cup spring washer 70 exerts a reaction force against the contact plate 58 in a direction toward the conductor 14, thereby securing contact between the contact plate 58 and the conductor 14. Therefore, the cup spring washer 70 serves as a thrust washer between the plate 58 and screw body 36 for increased clamping force, torque retention and dynamic connection.

Rotational movement of the contact plate 58 relative to the screw body 36 is enabled by minimizing the amount of contact between the contact plate 58 and the cup spring washer 70. More particularly, when the screw body 36, cup spring washer 70, and contact plate 58 are coupled to one another, the contact plate 58 contacts the cup spring washer 70 only along a rim defining aperture 72 of the cup spring washer 70, rather than along the entire projecting surface. This minimum amount of contact between the contact plate 58 and the cup spring washer 70 in turn minimizes the friction between the contact plate 58 and the projecting surface, thereby facilitating rotational movement of the contact plate 58 relative to the cup spring washer 70. No particular orientation of the contact plate 58 is required with the connector 10 of this invention.

The contact plate 58 is suitably shaped to minimize damage to conductor 14 engaged by the contact plate 58. More particularly, the contact surface in some embodiments is in the form of a smooth or flat surface, thereby spreading the force exerted by the screw assembly 22 against the conductor 14 throughout the entire area of the contact surface. Alternative embodiments of the contact plate are shown in U.S. Pat. No. 7,699,699, incorporated herein by reference in its entirety. Those of ordinary skill will readily appreciate other contact plate designs within the scope of this invention in addition to those disclosed herein.

The operation of the screw assembly 22 may be appreciated with respect to the structure depicted in FIGS. 1, 3 and 5. The screw assembly 22 is inserted into the body 12 of the connector 10 by engaging the exterior threads 34 of the screw body 36 with the threaded wall 20 in the bore 18 of the connector body 12. In this regard, rotation of the screw body 36 relative to the body 12 is facilitated by engagement of a tool (not shown) that engages either the internal or external a tool engaging portion 48, 42 at a proximal end of the screw body 36. In this exemplary embodiment, the internal tool engaging portion 48 is in the form of a socket configured to accept an Allen wrench and the external tool engaging portion 42 is on the periphery of the head 38. Persons of ordinary skill in the art however, will readily appreciate that other types of tool engaging portions may be substituted, such as portions configured to receive a different type of tool.

Rotation of the screw assembly 22 relative to the body 12 may be continued up to a point where the conductor 14 is contacted. This causes a reaction force to be exerted by the cup spring washer 70 against the contact plate 58 in the embodiment of FIGS. 4 and 5. This reaction force, in turn, causes a force to be exerted by the contact surface of the contact plate 58 against the conductor 14 in the body 12 of the connector 10. This force exerted against the conductor 14 thereby secures the connector 10 to the conductor 14.

Any subsequent expansion or contraction of the conductor 14 relative to the contact plate 58 does not result in decoupling of the screw assembly 22 relative to the body 12 of the connector 10. More particularly, any such expansion or contraction respectively causes a further deflection of the cup spring washer 70 or a return thereof to its original shape. Accordingly, the position of the screw body 36 relative to the body 12 of the connector 10 is fixed regardless of any relative expansion or contraction of the conductor 14. Likewise, any vibration of a structure containing the connector 10 will result in the conductor 14 exerting a force against the contact plate 58 which, in turn, exerts a force against the cup spring washer 70 which will react accordingly by deflecting or returning to its original shape rather than decoupling the threaded body 36 from the body 12 of the connector 10. In either of the embodiments shown in the drawings, continued rotation of the screw assembly 22 after engaging the conductor 14 results in exceeding the torque threshold of the assembly and fracture of the neck 40 with removal of the head 38.

The head 38 is held in place on the screw body 36 by a torque limiting feature, such as the neck 40, until a certain force is applied to the head 38 which exceeds the strength of the neck 40 as one example of a torque limiting feature.

FIGS. 1, 2 and 4 show the intact screw assembly 22 and FIGS. 2 and 4 show it screwed down into position within the connector. In this position, the screw assembly 22 is in contact with the conductor 14 so that the conductor 14 is secured against the connector 10. Again in FIGS. 3 and 5, a force has been applied to the head 38 which exceeds the strength of the torque limiting neck 40 that held the head 40 in place at the distal end of the screw body 36 and enabled the screw assembly 22 to be screwed down into position, such that the head 38 breaks loose from the distal end of the screw body 36 along the neck 40 as shown in FIGS. 3 and 5. The target force that must be applied to the head 38 to exceed the strength of the neck 40 should be approximately 250 in-lbs at a minimum in various embodiments of this invention.

Shown in FIGS. 2-4 is a bore 46 of the screw body that contains an internal drive 48 shaped to fit a hex key or Allen key. A lower portion 46a on the bottom end of bore 46 of the interior of the screw body 36 remains after the neck 40 is broken and the head 38 removed and allows the remaining screw body 36 to be backed out from the connector 10 after installation, if necessary, through the use of a hex key or Allen key. This removal feature allows the conductor 14 to be removed from the connector 10 at some point after installation if this is ever required, thereby preventing the torque controlling break screw 22 from being permanently installed in a connector 10.

From the above disclosure of the general principles of this invention and the preceding detailed description of at least one embodiment, those skilled in the art will readily comprehend the various modifications to which this invention is susceptible. Therefore, we desire to be limited only by the scope of the following claims and equivalents thereof.

We claim:

1. A break screw for securing a conductor within a connector, the break screw comprising:
    a threaded screw body;
    a head secured at a distal end of the threaded screw body, the head having an outer periphery forming an external drive mechanism;
    at least one torque limiting feature each of which keeps the head secured at the distal end of the threaded screw body;
    an internal drive mechanism exposed on the head and extending through the head and each of the at least one torque limiting feature and into the threaded screw body;
    wherein the threaded screw body and head in combination are screwed into an aperture within the connector via the external drive mechanism until the threaded screw body contacts a conductor housed within a connector body;
    wherein when a force is applied to the head via the external drive mechanism which exceeds a strength of the at least one torque limiting feature, it causes the head to break loose from the distal end of the threaded screw body by overcoming the at least one torque limiting feature with the remaining threaded screw body being seated within the connector and securing the conductor to the connector such that the internal drive mechanism is accessible for each of the at least one torque limiting features.

2. The break screw of claim 1, wherein the torque limiting feature which keeps the head secured at the distal end of the threaded screw body is comprised of a neck portion having a cross-sectional dimension less than the head and the threaded screw body.

3. The break screw of claim 1 wherein the internal drive mechanism is shaped to fit a driving tool so that the remaining threaded screw body which is within the connector can be backed out from the connector to be removed.

4. The break screw of claim 1 wherein the force that is required to break the head loose from being secured at the distal end of the threaded screw body and overcome the torque limiting feature must exceed 250 in-lbs.

5. The break screw of claim 1 further comprising:
    a contacting structure on the threaded screw body including a plate spaced from said threaded screw body and having a contacting surface configured for contacting the conductor, said plate being coupled to said threaded screw body such that said plate is rotatable relative to said threaded screw body when said threaded screw body is coupled to said connector, said plate being restricted from movement away from said threaded screw body when said threaded screw body is not coupled to said connector.

6. The break screw of claim 5 further comprising:
    a spacer urging said plate away from said threaded screw body.

7. The break screw of claim 1 wherein the torque limiting feature is connected directly to both the head and the threaded screw body.

8. A break screw for securing a conductor within a connector, the break screw comprising:
    a threaded screw body;
    a head secured at a distal end of the threaded screw body, the head having an outer periphery forming an external drive mechanism;
    at least one torque limiting feature each of which keeps the head secured at the distal end of the threaded screw body, the at least one torque limiting feature being connected directly to both the head and the threaded screw body;
    wherein the threaded screw body and head in combination are screwed into an aperture within the connector via the external drive mechanism until the threaded screw body contacts a conductor housed within a connector body;
    wherein when a force is applied to the head via the external drive mechanism which exceeds a strength of the at least one torque limiting feature, it causes the head to break loose from the distal end of the threaded screw body by overcoming the at least one torque limiting feature with the remaining threaded screw body being removably seated within the connector and securing the conductor to the connector;

wherein each of the at least one torque limiting feature which keeps the head secured at the distal end of the threaded screw body is comprised of a neck portion having a cross-sectional dimension less than the head and the threaded screw body;

an interior surface of the threaded screw body that contains a recessed portion forming an internal drive mechanism shaped to fit a driving tool so that the remaining threaded screw body which is within the connector can be backed out from the connector via the internal drive mechanism to be removed, the internal drive mechanism being exposed on the head and extending through the head and each of the at least one torque limiting feature and into the threaded screw body such that the internal drive mechanism is accessible irrespective of which of the at least one torque limiting features is overcome.

9. The break screw of claim 8 wherein the force that is required to break the head loose from being secured at the distal end of the threaded screw body and overcome the torque limiting feature must exceed 250 in-lbs.

10. The break screw of claim 8 further comprising:
a contacting structure on the threaded screw body including a plate spaced from said threaded screw body and having a contacting surface configured for contacting the conductor, said plate being coupled to said threaded screw body such that said plate is rotatable relative to said threaded screw body when said threaded screw body is coupled to said connector, said plate being restricted from movement away from said threaded screw body when said threaded screw body is not coupled to said connector.

11. The break screw of claim 10 further comprising:
a spacer urging said plate away from said threaded screw body.

12. An electrical connecting assembly for securing a conductor, comprising:
a connector;
a threaded screw body threadably engaged with the connector;
a head secured at a distal end of the threaded screw body, the head having an outer periphery forming an external drive mechanism; and
at least one torque limiting feature each of which keeps the head secured at the distal end of the threaded screw body;
an internal drive mechanism exposed on the head and extending through the head and each of the at least one torque limiting feature and into the threaded screw body;
wherein the threaded screw body and head in combination are screwed into an aperture within the connector via the external drive mechanism until the threaded screw body contacts a conductor housed within a connector body;
wherein when a force is applied to the head via the external drive mechanism which exceeds a strength of the torque limiting feature, it causes the head to break loose from the distal end of the threaded screw body by overcoming the at least one torque limiting feature with the remaining threaded screw body being seated within the connector and securing the conductor to the connector such that the internal drive mechanism is accessible irrespective of which of the at least one torque limiting features is overcome.

13. The assembly of claim 12 further comprising:
a contacting structure on the threaded screw body including a plate spaced from said threaded screw body and having a contacting surface configured for contacting the conductor, said plate being coupled to said threaded screw body such that said plate is rotatable relative to said threaded screw body when said threaded screw body is coupled to said connector, said plate being restricted from movement away from said threaded screw body when said threaded screw body is not coupled to said connector.

14. The electrical connecting assembly of claim 13 further comprising:
a spacer urging said plate away from said threaded screw body.

15. The electrical connecting assembly of claim 14, wherein said spacer is configured to deflect toward said threaded screw body where said plate contacts the conductor.

16. The electrical connecting assembly of claim 14, wherein said plate is rotatable relative to said spacer.

17. The electrical connecting assembly of claim 14 wherein said plate is rotatable relative to said spacer and said threaded screw body.

18. The electrical connecting assembly of claim 13, wherein said plate is configured for movement toward said threaded screw body.

19. An electrical connecting assembly for securing a conductor, comprising:
a connector;
a threaded screw body threadably engaged with the connector;
a head secured at a distal end of the threaded screw body, the head having an outer periphery forming an external drive mechanism;
at least one torque limiting feature each of which keeps the head secured at the distal end of the threaded screw body;
an internal drive mechanism exposed on the head and extending through the head and each of the at least one torque limiting feature and into the threaded screw body;
wherein the threaded screw body and head in combination are screwed into an aperture within the connector via the external drive mechanism until the threaded screw body contacts a conductor housed within the connector body;
wherein when a force is applied to the head via the external drive mechanism which exceeds a strength of the at least one torque limiting feature, it causes the head to break loose from the distal end of the threaded screw body by overcoming the at least one torque limiting feature with the remaining threaded screw body being seated within the connector and securing the conductor to the connector such that the internal drive mechanism is accessible for each of the at least one torque limiting features;
a contacting structure on the threaded screw body including a plate spaced from said threaded screw body and having a contacting surface configured for contacting the conductor, said plate being coupled to said threaded screw body such that said plate is rotatable relative to said threaded screw body when said threaded screw body is coupled to said connector, said plate being restricted from movement away from said threaded screw body when said threaded screw body is not coupled to said connector; and a spacer urging said plate away from said threaded screw body;

wherein said spacer is configured to deflect toward said threaded screw body where said plate contacts the conductor;

wherein said plate is rotatable relative to said spacer;

wherein said plate is configured for movement toward said threaded screw body; and wherein said plate is rotatable relative to said spacer and said threaded screw body.

20. The electrical connecting assembly of claim 19 wherein the torque limiting feature is connected directly to both the head and the threaded screw body and wherein the internal drive mechanism is shaped to fit a driving tool so that the remaining threaded screw body which is within the connector can be backed out from the connector to be removed.

\* \* \* \* \*